(12) United States Patent
Lundström et al.

(10) Patent No.: US 8,646,700 B2
(45) Date of Patent: Feb. 11, 2014

(54) METHOD AND DEVICE FOR OUTPUT OF GRANULATE FROM THE BOTTOM OF A TANK THAT IN ADDITION TO GRANULATE HOLDS LIQUID

(75) Inventors: Christoffer Lundström, Täby (SE); Kåre Folgerö, VästerÅs (DE)

(73) Assignee: Uvan Holding AB, Uddeholm (SE)

(*) Notice: Subject to any disclaimer, the term of this patent is extended or adjusted under 35 U.S.C. 154(b) by 412 days.

(21) Appl. No.: 13/000,035

(22) PCT Filed: Jun. 18, 2009

(86) PCT No.: PCT/SE2009/050765
§ 371 (c)(1),
(2), (4) Date: Jan. 25, 2011

(87) PCT Pub. No.: WO2009/157857
PCT Pub. Date: Dec. 30, 2009

(65) Prior Publication Data
US 2011/0210185 A1      Sep. 1, 2011

(30) Foreign Application Priority Data

Jun. 24, 2008   (SE) ...................................... 0801491

(51) Int. Cl.
| | |
|---|---|
| *B05B 7/30* | (2006.01) |
| *B05B 7/28* | (2006.01) |
| *B05B 7/26* | (2006.01) |
| *B01F 15/02* | (2006.01) |

(52) U.S. Cl.
USPC ................. 239/9; 239/10; 239/311; 239/345; 239/379; 239/428; 366/163.2

(58) Field of Classification Search
USPC ............... 239/9, 428, 10, 310, 311, 318, 340, 239/345, 369, 379, 433, 434, 434.5; 366/163.2; 417/163, 170

See application file for complete search history.

(56) References Cited

U.S. PATENT DOCUMENTS

| | | | | |
|---|---|---|---|---|
| 2,233,304 | A | * | 2/1941 | Bleakley .......................... 239/80 |
| 2,315,083 | A | * | 3/1943 | Chesler .............................. 241/5 |

(Continued)

FOREIGN PATENT DOCUMENTS

| | | |
|---|---|---|
| RU | 2064319 A | 7/1996 |
| SU | 1054244 A | 11/1983 |

OTHER PUBLICATIONS

"Water and Jet Eductors," (product sheet from Schuttle and Koerting). Address: http://www.s-k.com/pages/lit.html. Bulletin 2M, 07001, p. 14, figure 33. (May 7, 2001).

(Continued)

*Primary Examiner* — Darren W Gorman

(74) *Attorney, Agent, or Firm* — Thomas & Karceski, PC

(57) ABSTRACT

For transport of granulate from a granulation tank by means of liquid and air, an ejector is provided with a side inlet for granulate, a first end with a spray nozzle for pressurized transport liquid, and a second end with an inlet for pressurized gas. Downstream from the second end, an outlet spray nozzle for a three-phase flow of liquid, granulate, and gas is provided. A first conduit has a lower end connected with the outlet for transport of the three-phase flow. The ejector includes a tubular ejector housing with an internal wear liner and an outlet spray nozzle made from a durable material. The inlet for pressurized gas includes a ring-shaped chamber that surrounds the periphery of the ejector and is connected with the inside of the ejector through a ring-shaped slit that directs the pressurized gas towards the outlet of the ejector.

11 Claims, 2 Drawing Sheets

(56) References Cited

U.S. PATENT DOCUMENTS

| | | | |
|---|---|---|---|
| 2,809,866 A * | 10/1957 | Vessels | 239/9 |
| 3,550,195 A | 12/1970 | Campbell | |
| 3,881,656 A * | 5/1975 | Markfelt et al. | 239/336 |
| 4,225,086 A * | 9/1980 | Sandell | 239/428 |
| 4,294,784 A | 10/1981 | Mailund | |
| 4,396,355 A * | 8/1983 | Wilmot et al. | 417/160 |
| 5,017,218 A | 5/1991 | Lundstrom et al. | |
| 5,071,289 A | 12/1991 | Spivak | |
| 6,273,153 B1 | 8/2001 | Reinsch | |
| 6,422,827 B1 | 7/2002 | Hara | |
| 7,270,249 B1 | 9/2007 | Burkhead | |
| 2004/0141410 A1 * | 7/2004 | Fenton et al. | 366/163.2 |
| 2004/0200910 A1 * | 10/2004 | Graham et al. | 241/5 |
| 2005/0005842 A1 * | 1/2005 | Kimura et al. | 118/308 |

OTHER PUBLICATIONS

International Search Report for PCT/SE2009/050765, dated Oct. 15, 2009.
Written Opinion for PCT/SE2009/050765, dated Oct. 15, 2009.
Chinese Office Action dated Aug. 31, 2012, issued in corresponding Chinese Patent Application No. 200980125194.5.

* cited by examiner

METHOD AND DEVICE FOR OUTPUT OF GRANULATE FROM THE BOTTOM OF A TANK THAT IN ADDITION TO GRANULATE HOLDS LIQUID

CROSS-REFERENCE TO RELATED APPLICATION(S)

This United States Non-Provisional Patent Application is a National Stage Entry into the United States Patent from PCT Patent Application No. PCT/SE2009/050765, having an international filing date of 18 Jun. 2009, the contents of which are incorporated herein by reference. This patent application also relies for priority on Swedish Patent Application No. SE 0801491-2, filed on 24 Jun. 2008, the contents of which are incorporated herein by reference.

TECHNICAL AREA

The current invention concerns a method and a device for output of granulate from the bottom of a tank that in addition to granulate holds liquid.

STATE OF THE ART

Granulates of metals and metal alloys are manufactured in that a jet of molten metal or alloy may hit an impact element and be scattered into drops that fall into a liquid tank having a narrowing conical bottom so that they quickly cool. A successful method and device is described in U.S. Pat. No. 4,294,784. In order to avoid the granulate sintering together into larger aggregates, the granulate is moved out of the cool water tank as soon as the drops have congealed after cooling, after which the water can run off and the granulate can dry due to its own inherent heat. The heated cooling water is used for transport, which runs out of the tank by itself at the lowest point in the bottom and brings with it the congealed granulate through a bend and up through an inclined riser to a separation surface, where the granulate is separated out and the water goes into a basin from which it is recirculated by a pump into the tank. The separation surface is located at a level lower than the water level in the tank, so the water streams out by its own pressure through the inclined riser. To aid transport of granulate up through the inclined riser, it is provided with a compressed air injector with a number of inlets for compressed air arrayed on the under side of the inclined riser that provides an effect resembling that of mammoth pumps.

U.S. Pat. No. 5,017,218 describes a further development of the above-mentioned invention according to U.S. Pat. No. 4,294,784. The further development makes it possible to granulate metals and alloys that have a low sinking speed in water and high heat content.

Even though the method and device described in U.S. Pat. No. 4,294,784 have proven to be successful, it may occur under certain operational circumstances that the device does not manage to transport the granulate through the bend up to the compressed air injector in a satisfactory manner. The inclined riser further has the property that the granulate tends to sink towards the under side of the inclined conduit and that the air rises towards its upper side where it may form a more or less continuous channel.

BRIEF DESCRIPTION OF THE INVENTION

The object of the present invention is to produce a device for output of granulate that can manage the transportation of granulate from the tank without problems.

With a procedure of the kind indicated initially this object can be achieved in that the output is attained in agreement with the present invention by means of a tubular ejector provided under the tank.

With a device of the kind indicated initially this object is achieved in that the device in agreement with the present invention comprises a tubular ejector provided under the tank that has a side inlet for granulate, an end with an inlet for pressurized transport water, and another end with an inlet for pressurized gas and downstream from that an outlet for a three-phase flow of water, granulate, and gas.

By replacing the bend in the tube previously used by an ejector the risk that the granulate could collect at the lowest point of the bend in the tube is eliminated. Use of pressurized transport water instead of cooling water in the tank for transport of granulate offers the possibility of maintaining a higher flow speed in the water. The chosen location of the inlet for pressurized gas means that the gas can begin its pumping effect earlier than with the known design without the risk of the gas flowing backwards up through the tank. Momentary transport of granulate up from the tank is thus ensured by means of water and gas that together give the granulate a directional vector that pushes it away from the tank in the connected tube system.

The tubular ejector is preferably directed so that it forms an angle on the order of 90° to a perpendicular line. It thus has a low construction height and it is generally easy to install it when an existing device for output of granulate is remodeled.

The ejector is suitably connected to a first conduit that extends mainly vertically upwards and has a lower and an upper end with the lower end connected to the outflow of the ejector and the first conduit is dimensioned to let gas transport the water and granulate upwards through the first conduit during successive expansion of the gas and acceleration of the water and granulate. Due to the conduit being vertical there is no risk that the granulate should tend to collect on one side and the gas on the other side of the conduit.

The inlet for the pressurized transport water is preferably in the form of a spray nozzle. A spray nozzle lends increased streaming speed to the transport water, which increases the turbulence in the ejector and contributes to keeping the granulate in suspension in the water during transport through the ejector.

Since some granulate will contact the ejector internally during its transport, it is preferable that the ejector includes a tubular ejector housing that is provided with an internal wear liner.

The inlet for pressurized gas also includes a ring-shaped chamber that surrounds the periphery of the tubular ejector and is connected with the inside of the ejector through a ring-shaped slit that directs the pressurized gas towards the outlet of the ejector. The supply of gas through a ring-shaped slit contributes to producing the desired turbulence in the three-phase flow that forms and decreases the risk that the gas would form its own channel in it.

The degree of wear increases in the direction of streaming through the ejector and is greatest at the outlet, for which reason the outlet for the three-phase flow from the ejector is advantageously constituted by a replaceable wear flange shaped like a spray nozzle. The ring-shaped gas supply slit is advantageously formed between the internal wear liner and the wear flange shaped like a spray nozzle.

BRIEF DESCRIPTION OF THE ENCLOSED DRAWINGS

In the following the invention will be described in more detail with reference to preferred embodiments and the enclosed drawings.

DETAILED DESCRIPTION OF PREFERRED EMBODIMENTS

Figure 1:
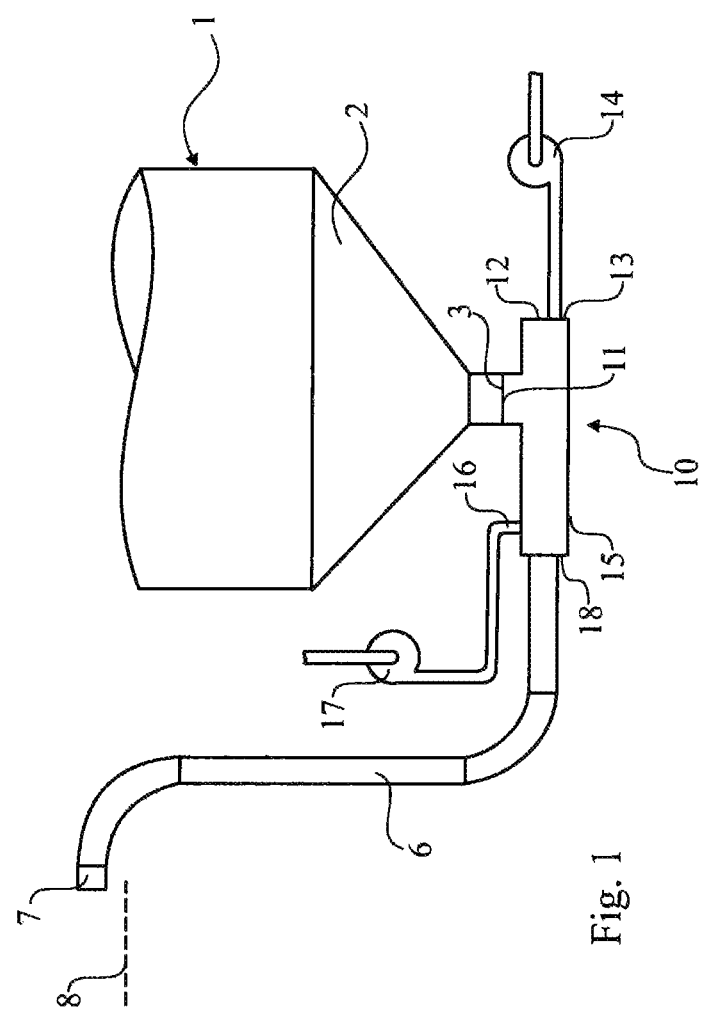
FIG. 1 is a schematic side view of a device according to a preferred embodiment of the invention for output of granulate from a tank. The device comprises an ejector connected with the tank and a subsequent pipe system.

FIG. 1 shows a device for output of granulate from a tank 1. Granulate of metals or metal alloys is produced in a known way in that a jet (not shown) of molten metal or alloy is allowed to hit a fireproof impact element (not shown) and be scattered into drops that fall into the tank 1 that contains cooling water so that they are quickly cooled. The tank has a narrowing conical bottom 2 with an outlet 3 for mixing granulate and used cooling water. New cooling water is supplied at another place by means of a conduit (not shown) and excess cooling water is generally supplied so that there is also an overflow for conducting away used cooling water. After quick cooling a mixture of the granulate formed and water from the outlet 3 is conducted through a conduit system 6, 7 with air supply for formation of a three-phase flow and farther up to a separation surface 8, for example a vibrating sieve, that is located at a higher level than the outlet 3, where the water can run off from the granulate that is then conveyed to a drying unit (not shown).

Figure 2:
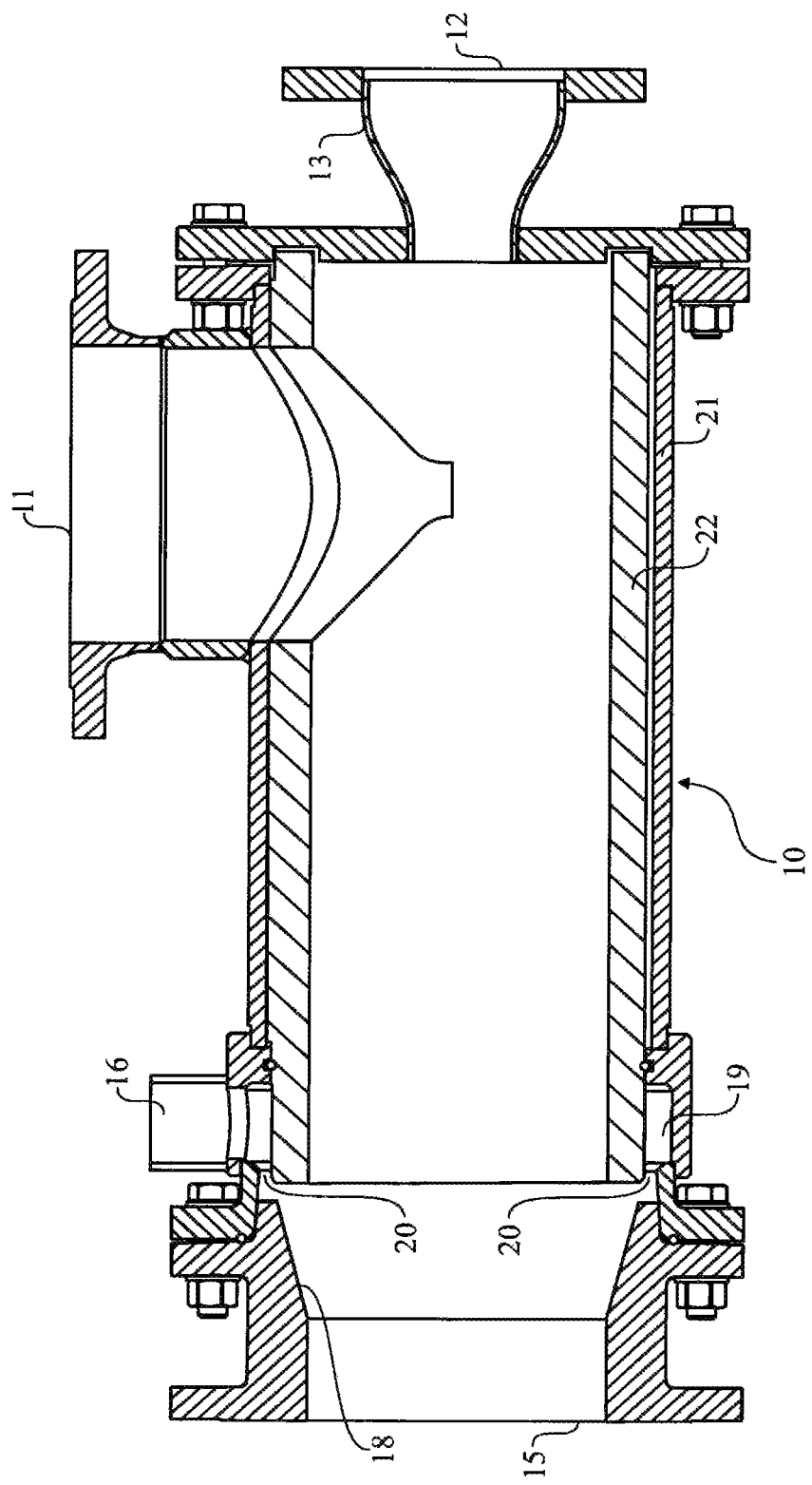
FIG. 2 is a schematic longitudinal section through the ejector shown in FIG. 1.

In order to ensure momentary transport up of granulate from the tank 1 by means of water and air, the output device according to the invention contains a tubular ejector 10 under the tank 1 as shown in FIG. 2. The tubular ejector 10 has a side inlet 11 for granulate connected with the tank outlet 3, an end 12 with an inlet 13 for pressurized transport water and another end 15 with an inlet 16 for pressurized gas and downstream from there an outlet 18 for a three-phase flow of water, granulate, and gas. Transport water is taken from a source (not shown) and pressurized by a pump 14, while the gas is taken from a suitable source, generally ambient air, that is pressurized with a blower or compressor 17 for compressed air with a predetermined pressure, for example 3 bar. The term compressed air is used below for the pressurized gas that can, however, be constituted of any suitable gas. Air consumption in a granulation facility of standard size is on the order of 10-30 normal cubic meters per hour at a pressure of approximately 3 bars.

The ejector 10 is preferably directed so that it forms an angle on the order of 90° to a perpendicular line. It thus has a low construction height and it is generally easy to install it when an existing device for output of granulate is remodeled. If desired, the ejector 10 may, however, be inclined upwards in an embodiment not shown and it is even imaginable that it is connected to the bottom outlet 3 of the tank 1 with a pipe bend (not shown), whereby one should use a pipe bend in a form that prevents granulate from collecting at its lowest point.

By replacing the previously used pipe bend with an ejector 10 the risk is eliminated that the granulate would collect at the lowest point of the pipe bend. Use of pressurized transport water instead of cooling water in tank 1 for transport of the granulate offers the possibility of maintaining higher streaming speed in the water. The selected position of the inlet 15 for compressed air further means that it can begin its pumping action earlier than with the known design without any risk of the air flowing through the back way up through the tank 1. Momentary transport upwards of granulate from the tank 1 is thus ensured by means of water and air that together give the granulate a directional vector that in connected pipe systems 6, 7 push it in a direction away from the tank 1.

As can be seen from FIG. 1, the ejector 10 is suitably connected to a first conduit 6 that extends mainly vertically upwards and has a lower and upper end with the lower end connected with the outlet 18 of the ejector. The first conduit 6 is dimensioned to let air transport the water and granulate upwards through the first conduit 6 with successive increase of the air and acceleration of the water and the granulate. In that the conduit 6 is mainly vertical, there is no risk that the granulate would tend to collect on one side and the air on the other side of the conduit.

It is suitable that a second conduit 7 have a free end that is connected to the upper end of the first conduit 6 and that this second conduit 7 forms an angle on the order of 90° with a plumb line. An outlet is obtained in this way for a separation surface 8, for example a vibrating sieve, where the granulate is separated from the transport water, after which it either dries by itself from its inherent heat or is conveyed to a drying unit (not shown). An embodiment where the upper end of first conduit 6 discharges in an upright outflow under a hood or shield (not shown) is also imaginable. This hood or shield has the purpose of limiting the height of the outflow of transport water and granulate and possibly even diverting it in some direction to the separation surface 8.

As shown in FIG. 2, the inlet for pressurized transport water preferably has the form of a spray nozzle 13. A spray nozzle lends increased streaming speed to the transport water, which increases the turbulence in the ejector 10 and contributes to keeping the granulate in suspension in the water during transport through the ejector. With granulate production of approx. 1.5 tons/min a water flow of approx. 2 m$^3$/min is used, while if production increases to approx. 4.1 tons/min, the water flow increases to 6 m$^3$/min.

Since some granulate will contact the ejector internally during its transport, it is preferable that the ejector include a tubular ejector housing 21 that is provided with an internal and replaceable wear liner 22 which in the shown embodiment is integrally embodied.

The inlet 16 for pressurized gas preferably comprises a ring-shaped chamber 19 that surrounds the periphery of the tubular ejector 10 and is connected with the inside of the ejector through a ring-shaped slit 20 that directs the pressurized gas towards the outlet 18 of the ejector. Supply of gas through the ring-shaped slit 20 contributes to producing the desired turbulence in the three-phase flow that forms and decreases the risk that the gas would form its own channel in it. A direction of the three-phase flow is further obtained that distributes itself relatively evenly along the periphery of the tubular ejector 10. One-sided wear on one or some of the parts of the outlet 18 and the wear flange 18 of the ejector is thus avoided.

The degree of wear increases in the direction of streaming through the ejector 10 and is greatest at the outlet 18, for reason of which the outlet for the three-phase flow from the ejector is advantageously constituted by a replaceable wear flange 18 shaped like a spray nozzle. The ring-shaped supply slit 20 for compressed air is advantageously formed between the internal wear liner 22 and the wear flange 18 shaped like a spray nozzle. If desired, the wear liner 22 may of course contain several separate, individual, replaceable parts (not shown) so that the whole wear liner doesn't need to be exchanged if only the wear liner part closest to the wear flange needs to be exchanged. The design has the advantage that with retention of the housing 21 different materials can be chosen for the wear liner 22 and the wear flange 18 in order to minimize the wear with different granulate materials.

ALTERNATIVE EMBODIMENTS

In the preferred embodiment water is used as cooling and transport medium but is shall be understood that other liquids or mixture of liquids that works with the material being granulated and serves a purpose of transportation of the granules may be used without departing from the idea of the invention. For example, a mixture of water and glycol can be used.

INDUSTRIAL APPLICATION

The granulate output device according to the invention is intended for application in facilities for granulation of iron, steel, and other metals and alloys but may also be used for transport of other solid matter.

The invention claimed is:

1. A method for transport of at least granulate from a bottom of a tank containing the granulate and a liquid, comprising:
    injecting pressurized liquid into a tubular ejector connected to the bottom of the tank via a spray nozzle;
    drawing the granulate and the liquid from the bottom of the tank into the tubular ejector at a first position downstream of the spray nozzle;
    injecting pressurized gas into the tubular ejector at a second position downstream from the first position, before the granulate and the liquid exit from the tubular ejector; and
    ejecting from the tubular ejector, at a third position downstream from the second position, a three-phase flow of the liquid, the granulate, and the gas.

2. The procedure according to claim 1, wherein the tubular ejector is directed so that it forms an angle on the order of magnitude of 90° to a direction of the force of gravity.

3. The procedure according to claim 2, wherein injecting of pressurized gas is done through a ring slit surrounding a granulate liquid mixture immediately before a formed three-phase mixture exits the ejector.

4. An apparatus for transport of at least granulate from a bottom of a tank containing the granulate and a liquid, comprising:
    a tubular ejector, the tubular ejector being connected to the bottom of the tank, underneath the tank;
    a first end defined by the tubular ejector having a first inlet, wherein the first inlet receives pressurized liquid therein;
    a second end defined by the tubular ejector having an outlet,
    a second inlet disposed between the first inlet and the outlet, the second inlet being connected to the bottom of the tank for input of at least the granulate from the tank into the tubular ejector; and
    a third inlet disposed between the second inlet and the outlet, the third inlet being connected to a source of pressurized gas for input of a pressurized gas into the tubular ejector,
    wherein the outlet discharges a three-phase flow of the liquid, the granulate, and the gas.

5. The device according to claim 4, wherein the tubular ejector forms an angle on the order of a magnitude of 90° with a direction of the force of gravity.

6. The device according to claim 5, further comprising a first conduit that extends mainly vertically upwards and has a lower and an upper end with the lower end connected to the outlet of the ejector of which first conduit is dimensioned to let gas transport the liquid and granulate upwards through the first conduit during successive expansion of the gas and acceleration of the liquid and granulate.

7. The device according to claim 5, wherein the first inlet is in the form of a spray nozzle.

8. The device according to claim 5, wherein the ejector comprises a tubular ejector housing that is provided with an internal wear liner.

9. The device according to claim 5, wherein the inlet for pressurized gas comprises a ring-shaped chamber that surrounds a periphery of the tubular ejector and is connected with the inside of the ejector through a ring-shaped slit that directs the pressurized gas towards the outlet of the ejector.

10. The device according to claim 5, wherein the outlet for a three-phase flow from the ejector is constituted by a replaceable wear flange formed as a spray nozzle.

11. The device according to claim 5, wherein the ejector comprises a tubular ejector housing that is provided with an internal wear liner, wherein the inlet for pressurized gas comprises a ring-shaped chamber that surrounds a periphery of the tubular ejector and is connected with the inside of the ejector through a ring-shaped slit that directs the pressurized gas towards the outlet of the ejector, wherein the outlet for the three-phase flow from the ejector is constituted by a replaceable wear flange that is formed as a spray nozzle, and wherein the ring-shaped slit is formed between the internal wear liner and the wear flange shaped as a spray nozzle.

* * * * *